United States Patent [19]

Wykhuis

[11] Patent Number: 4,506,747
[45] Date of Patent: Mar. 26, 1985

[54] AXLE TUBE AND HYDRAULIC MOTOR HOUSING MOUNTING ARRANGEMENT

[75] Inventor: Lloyd A. Wykhuis, Mayville, Wis.

[73] Assignee: Deere & Company, Moline, Ill.

[21] Appl. No.: 419,666

[22] Filed: Sep. 20, 1982

[51] Int. Cl.³ ............................................... B60K 7/00
[52] U.S. Cl. .................................... 180/62; 180/308; 180/905; 403/22; 403/337; 411/104; 411/177
[58] Field of Search ............... 180/62, 242, 308, 56, 180/65.5, 65.6, DIG. 1; 403/22, 337; 411/104, 105, 166, 177

[56] References Cited

U.S. PATENT DOCUMENTS

| 3,008,531 | 11/1961 | Howard | 180/308 X |
|---|---|---|---|
| 3,422,917 | 1/1969 | Guinot | 180/308 X |
| 3,612,205 | 10/1971 | Barrett | 180/308 |
| 3,949,824 | 4/1976 | Bennett | 180/62 |
| 4,445,588 | 5/1984 | Truninger | 180/242 X |

Primary Examiner—Joseph F. Peters, Jr.
Assistant Examiner—Michael Mar

[57] ABSTRACT

An axle and hydraulic motor mounting arrangement for vehicle wherein the vehicle has parallel sidewalls between which an axle tube is fixably mounted. A hydraulic motor is fixably mounted into each end of the axle tube such that torsional resistance between the motors is provided by the axle tube. The axle tube also resists opposing motion of the vehicle mounting sidewalls.

2 Claims, 4 Drawing Figures

AXLE TUBE AND HYDRAULIC MOTOR HOUSING MOUNTING ARRANGEMENT

BACKGROUND OF THE INVENTION

This invention relates to the mounting arrangements for the hydraulic motor component of a hydrostatic power transmission system, and more particularly, to a mounting system uniquely adapted to be employed on a vehicle having a unibody frame.

It is customary to provide some vehicles with unibody frames. A unibody frame refers to the utilization of the body of a vehicle to function also as a structural element. When a hydrostatic transmission system is employed in a vehicle having a unibody frame construction and the motor units are mounted opposite and independent of one another, the force created during turning and other maneuvers can subject the frame structure to extreme torsional loading. Because of the torsional loading, the unibody frame structure can experience early failure. In addition, the stability of the structure during maneuvers is decreased. This condition is applicable to some varieties of lawn and garden tractors. The problem of torsional loads on a unibody frame lawn and garden tractors is amplified when a working implement is supported by the vehicle.

It is possible to decrease the susceptibilty of a unibody frame vehicle to torsional loading by employing vehicle components such as the vehicle engine as a stiffening agent for the vehicle. However, the use of vehicle component as stiffening agents will require component hardening which will introduce significant increases in cost and weight to the vehicle. Another means to reduce the susceptibility of a vehicle to torsional load is to provide independent stiffeners, however, present methods have not proved totally satisfactory.

SUMMARY OF THE INVENTION

It is an objective of the present invention to present an assembly for stiffening a unibody frame portion of a vehicle. It is another objective of the present invention to present a mounting arrangement integral to the stiffening assembly for the mounting of hydraulic motors associated with hydrostatic transmission drive system. It is a further benefit of the present invention that the motors are maintained in proper alignment to increase the maneuverabilty and stability of the vehicle.

A unibody framed vehicle in accordance with an embodiment of the present invention includes a portion having opposite sidewalls for the location of motor units associated with a hydrostatic transmission drive system. Between the sidewalls is placed an axle tube. The axle tube contains a plurality of keyways around each end such that the housing of a motor unit can be extended through the sidewall and into a respective end of the axle tube. Each keyway is designed to receive a nut such that the nut cannot experience rotational motion. Bolts are extended through a support flange of a respective motor and the sidewall of the housing to be threadably received within a respective nut. Each keyway allows tightening of the bolt without the use of additional means for maintaining the nut in a stable orientation.

DESCRIPTION OF THE PREFERRED EMBODIMENT

Figure 1:
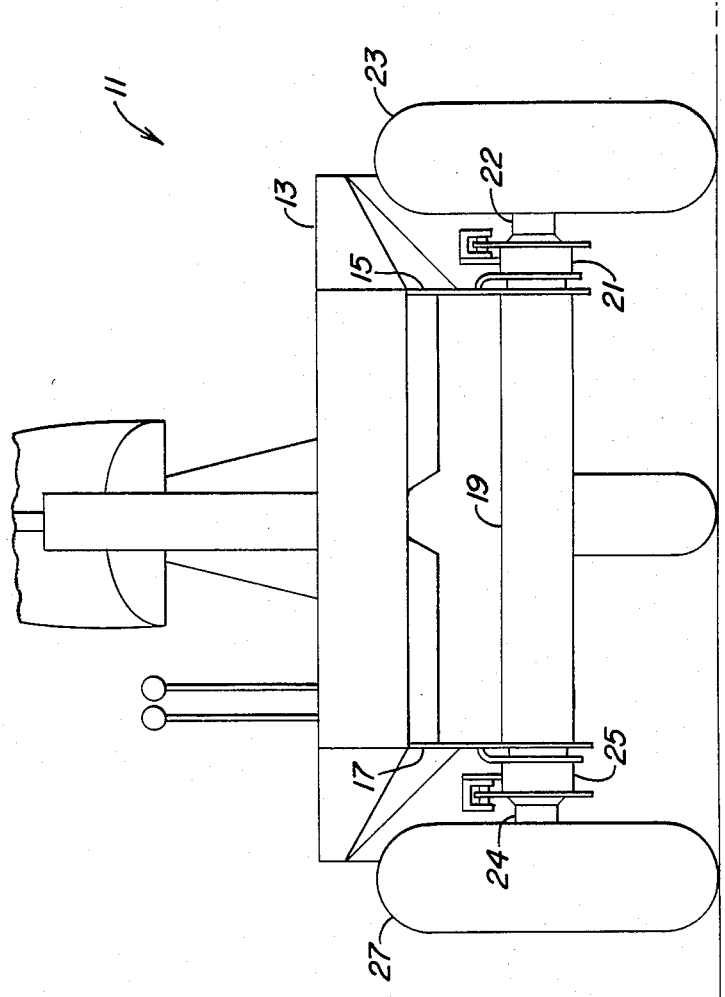
FIG. 1 is a front elevated view of a lawn and garden tractor employing a unibody frame construction and a hydrostatic transmission motor mounting arrangement in compliance with the present invention.

Referring to FIG. 1, a vehicle, generally indicated as 11, of a unibody frame construction or at least partial unibody frame construction indicated as 13, includes a right drive wheel mounting wall 15 and a left drive wheel mounting 17 as viewed in FIG. 1. An axle tube 19 extends between and is received in the right and left walls 15 and 17 respectively. A right hydraulic motor 21 is mounted in the right hand side of the axle tube 19 and has a motor axle 22 extending to a drive wheel 23 and thereto mounted in a conventional manner. A left hydraulic motor 25 is mounted into the left hand end of the axle tube 19 and includes a motor axle 24 which is fixably mounted by a conventional means to a left drive wheel 27.

Figure 2:
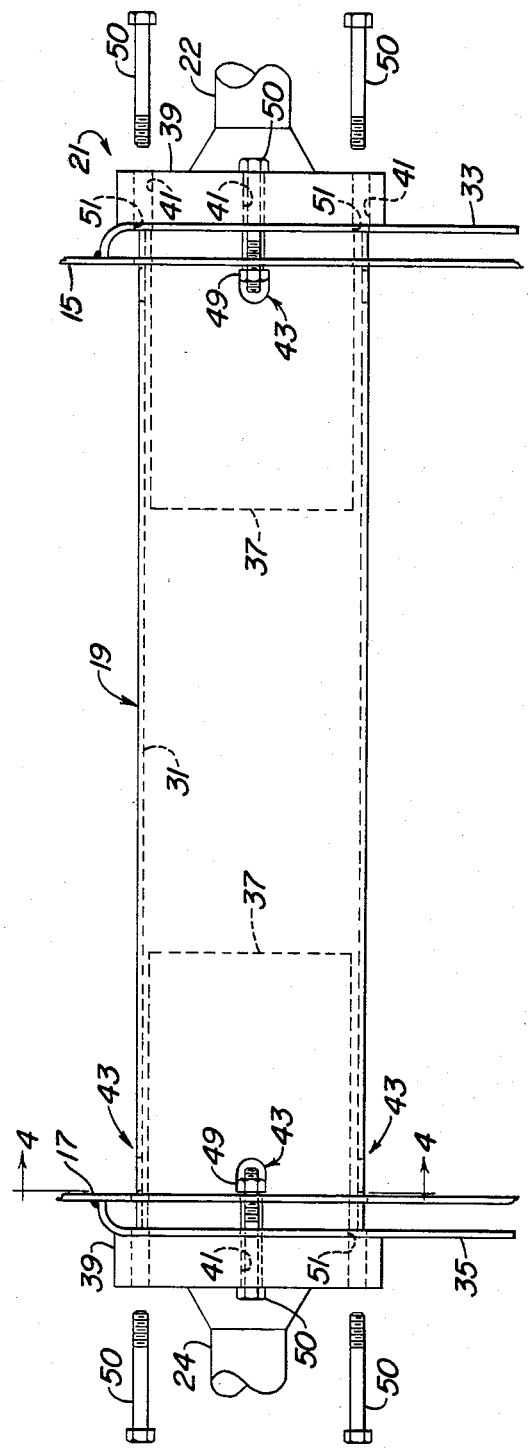
FIG. 2 shows a partial elevated side view of the axle tube and hydraulic motor mounting arrangement.

Referring more particularly to to FIG. 2, the axle tube 19 defines a chamber 31 and extends through the frame walls 15 and 17 at its respective ends to abutt outwardly located pilot flange 33 on frame 15 and flange 35 on frame wall 17. The pilot flanges 33 and 35 are fixably mounted to the respective frame walls 15 and 17 by any conventional means such as welding. The hydraulic motors 21 and 25 each contain a base housing 37 sized to be received in the chamber 31 of the axle tube 19, passing through the respective pilot flange 15 or 17. Each motor base housing 37 has a flanged lip 39 at its end which abates the respective pilot flange 33 or 35. Each flange lip 39 has a plurality of transverse passageways 41 spaced about the flange lip 39. The pilot flanges 33 and 35 also has a plurality of passageways 51 which are aligned to the plurality of keyways 43 which are spaced around respective ends of the axle tube 19.

Figure 3:
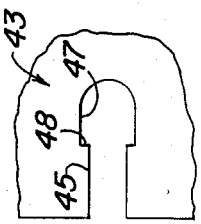
FIG. 3 shows an enlarged plane view of a keyway employed in the present invention.
Figure 4:
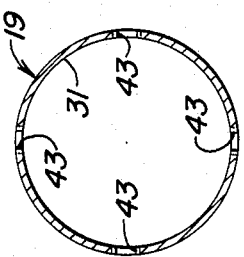
FIG. 4 shows an elevated end view of the axle tube along line 3—3.

Referring more particularly to FIGS. 3 and 4, each keyway 43 spaced around respective ends of axle tube 19 is comprised of the first and second sections 45 and 47, respectively, the first section 45 experiencing a step increase in width to section 47 to create an abutting surface 48 within the keyways 43. The width of the second section 47 is cooperative with the width of a nut 49. The nut 49 is placed in the section 47 such that the nut 49 cannot experience rotational motion within the particular keyway section 47 and to abut the surface 48. For mounting of the motors 21 and 25, bolts 50 are journeyed through the respective passageways 41, 51 and into the keyway 43 to be secured threadably in a respective nut 49.

It is observed that this mounting arrangement provides on torsional loads experienced by the vehicle to be transmitted through the tubular axle 19 allowing the tubular axle 19 to function not only as a mounting means for the respective motor units 21 and 25, but also as a means of resisting torsional loading of the vehicle.

I claim:

1. An axle and hydraulic motor mounting arrangement for a vehicle comprising:

(a) a vehicle having first and second sidewalls generally parallel and oppositely aligned, each of said sidewalls having an opening in opposite alignment;

(b) an axle tube having each end received in a respective opening of said sidewalls;

(c) a first hydraulic motor having a first section sized to be received in one end of said axle tube;

(d) a second hydraulic motor having a first section sized to be received in the other end of said axle tube;

(e) means for fixably mounting said axle tube to said first and second hydraulic motors and said sidewalls, said means including said first and second motors having a flanged portion and said sidewalls having a flanged portion such that said flanged portion of each said respective sidewalls is sandwiched between a respective end of said axle tube and said flange of said respective motor; a plurality of nuts; said axle tube having a plurality of keyways spaced around each respective end, and sized to receive a respective one of said nuts such that said bolt cannot experience rotational motion; a plurality of bolts, each of said bolts extending through said flange of said respective hydraulic motor and said respective flange portion of said sidewall into said respective keyway to be threadably engaged in a respective nut.

2. An axle mounting arrangement for the hydraulic motor unit for a vehicle employing a unibody frame comprising: a unibody frame having a forwardly located vertically and parallel aligned walls; each of said walls having an aligned opening and a pilot flange formed around said opening of said respective sidewall; an axle tube having a generally linear extension, each respective end of said axle tube being received by and extending through a respective one of said sidewalls to abutt a respective pilot flange, a hydraulic motor having a first section sized to be received in a respective end of said axle, said axle tube having a plurality of keyways located around its respective ends in spaced apart relationship, each of said keyways having a first and second section, said first section being of reduced width with respect to said second section and initiating at the end of said axle tube, a nut sized to be received in said second section of said keyway, for locking said nut against motion rotational movement; a bolt extending through said flange of said motor and said pilot flange, and into said first section of said keyway to be threadably engaged in said respective nut.

* * * * *